Patented Jan. 30, 1934

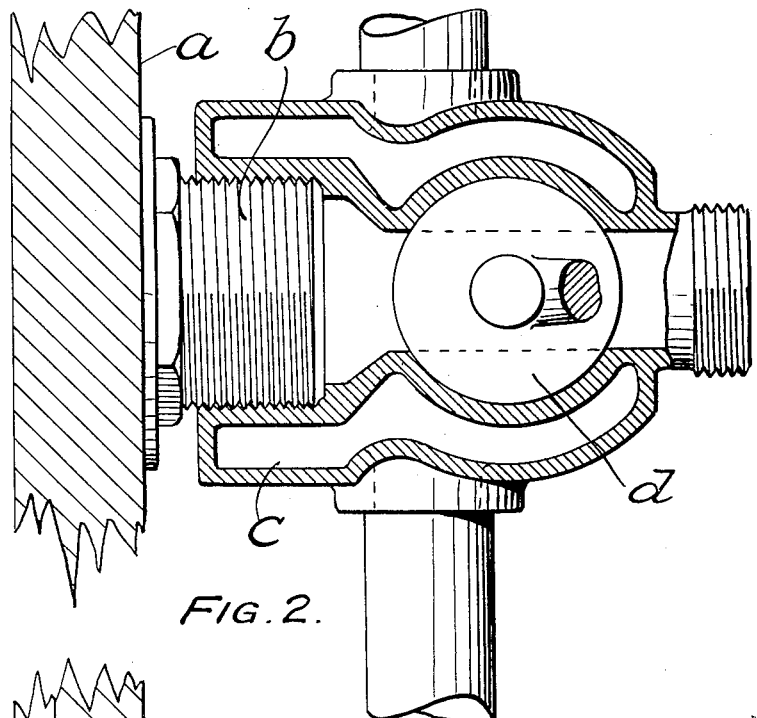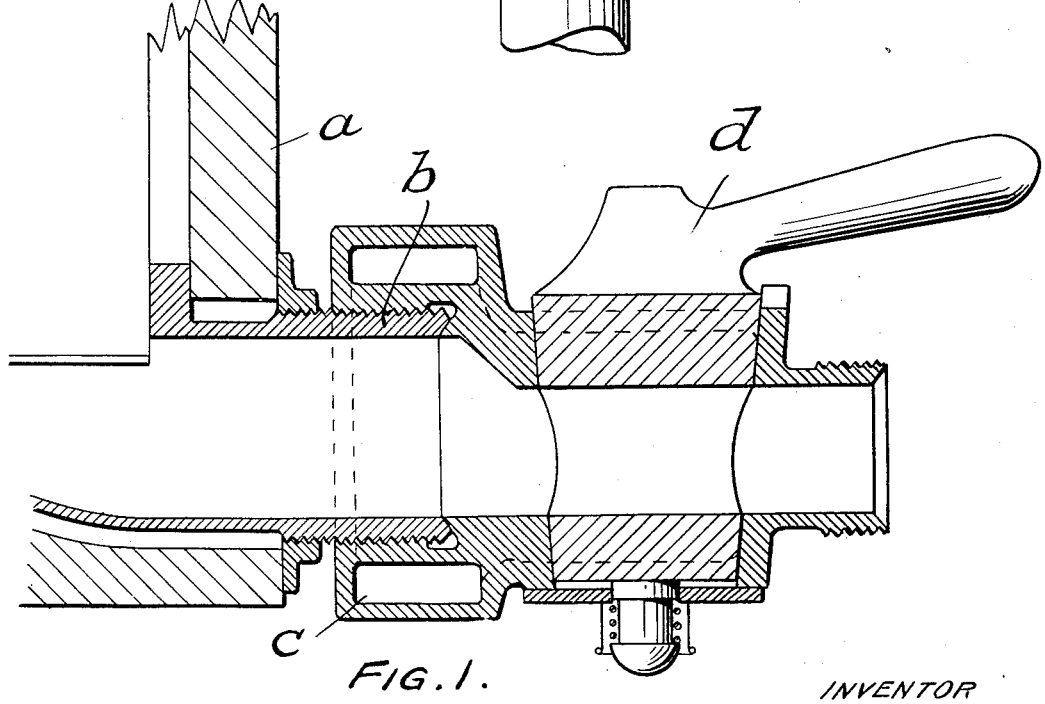

1,945,333

UNITED STATES PATENT OFFICE 1,945,333

MILK PASTEURIZER

William Sangster, Peterborough, Ontario, Canada, assignor to The De Laval Separator Company, New York, N. Y., a corporation of New Jersey Application January 6, 1932. Serial No. 584,959

8 Claims. (Cl. 257—79)

My invention relates to milk and cream pasteurizers one type of which is disclosed in patents issued to me Dec. 11, 1928, Nos. 1,694,452 and 1,695,207 and in an application filed by me October 19, 1928, Serial No. 313,446. Such milk pasteurizers comprise a horizontally extending vessel with thick walls of insulating material within which is a pipe coil, which may be an Archimedean screw, through which, by fluid pressure, or by the rotation of the screw, or both successively, hot water or other fluid heating medium is forced; the heating medium flowing in an endless circuit through a heater, a pipe, the screw and an outside return pipe back to the heater. The pasteurizer may also be used as a cooler, in which case provision is made for flow of cold water or brine through the coil. There is also provided a milk or cream draw-off comprising a pipe affording an outlet channel. The draw-off, positioned at one end of the bottom of the vessel, is provided with a valve which is closed during the treatment of the milk or cream and is opened when the operation is concluded to allow the milk to flow out. This valve cannot be conveniently located except outside the pasteurizing chamber. Consequently there is afforded, between the interior of the chamber and the valve, a pocket within which settles a small amount of milk, which remains therein substantially quiescent during the heat treatment and is not subjected to the heat except, inadequately, by conduction.

In said Patent No. 1,694,452 the channel or milk pocket between the pasteurizing chamber and the valve chamber is provided with a jacket which is connected with a by-pass from the endless heating fluid circuit, whereby the milk in the pocket may be subjected to the same heat treatment as the milk in the pasteurizing chamber proper. In said Patent No. 1,695,207 the heater surrounding this pocket is made removable. However, if the pasteurizer is so operated that the Archimedean screw is stopped during the necessary "holding period" (which operation is preferred and followed by many operators), the circulation through the coil ceases and there is little circulation of milk in the pasteurizing vessel and the plug of milk in said pocket chills more rapidly than the milk in the pasteurizing chamber proper. In said application filed October 19, 1928 steam is admitted to the valve when the valve is closed, thereby sterilizing the valve cock as well as preventing the adjacent plug of milk from cooling off more rapidly than the milk in the body of the pasteurizing chamber and in fact maintaining it warmer than the warm body of milk so as to induce a circulation of milk. The use of steam, however, is open to some objection, since it causes a deposit of casein or "milk stone" in the passageways.

The present invention has for its object to effectively heat the pocketed milk in said outlet pipe both during the period of application of heat to the main body of milk or cream and during the "holding period", if the rotation of the coil is stopped, while avoiding direct heating by means of steam.

A preferred embodiment of the invention is shown in the accompanying drawings, wherein—

Fig. 1 is a vertical sectional view of the milk outlet, the valve controlling such outlet and the special heating jacket.

Fig. 2 is a horizontal sectional view of the parts shown in Fig. 1.

Figure 3:
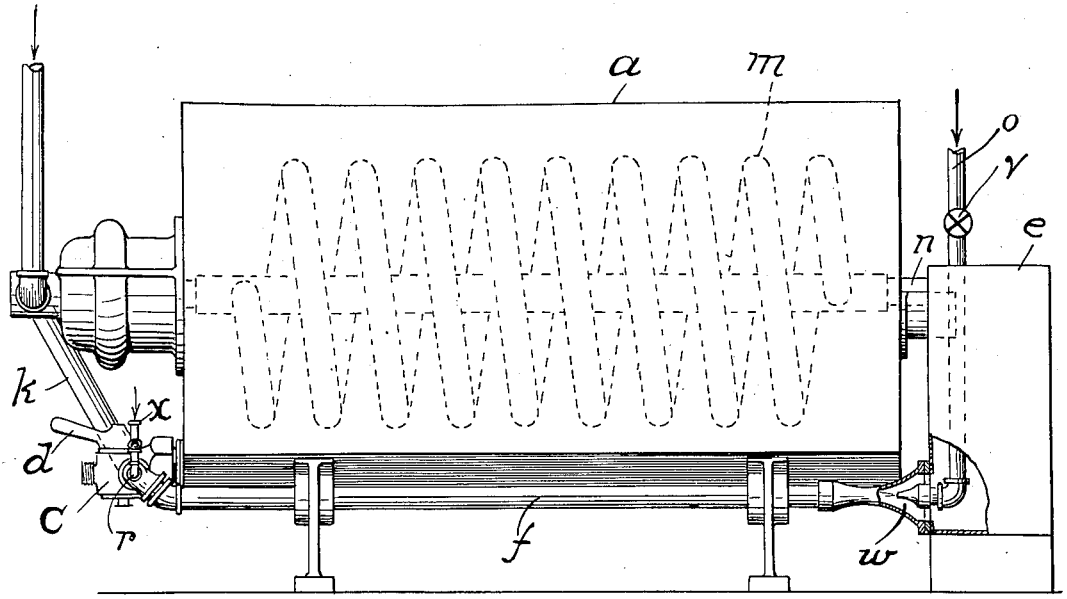
Fig. 3 is a side elevation of a pasteurizer embodying the invention.
Figures 4, 5:
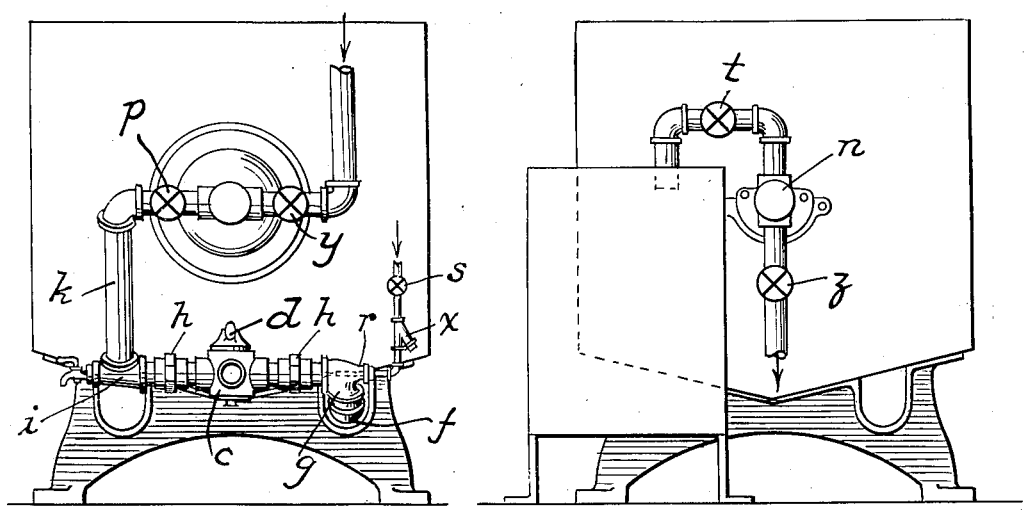
Figs. 4 and 5 are views of the pasteurizer from opposite ends.

The pasteurizing vessel $a$ is provided with an outlet comprising a screw-threaded pipe or nozzle $b$ on which is threaded a jacket $c$ which is extended forward and shaped to partly surround a valve $d$, thereby forming the main part of the valve casing. Valve $d$ controls the discharge of milk from vessel $a$. The jacket $c$ is connected, at opposite sides, through unions $h$, $h$, with elbow fittings $g$ and $i$. One fitting, $i$, is connected through pipe $k$ (equipped with a valve $p$) with one end of a continuous pipe coil $m$ within vessel $a$. The other fitting $g$ is connected, through a circulating pipe $f$, with a tank $e$, into which extends a pipe $n$ (equipped with a valve $t$) constituting a prolongation of the pipe coil $m$. In receptacle $e$ the heating fluid, which is preferably water, is heated by means of a steam coil (not shown) or other appropriate means.

Steam may be admitted to pipe $f$ through a steam pipe $o$ (equipped with a valve $v$) and an injector $w$.

The fitting $g$ is a T fitting equipped with a small auxiliary injector $r$ controlled by a valve $s$. A strainer $x$ may be provided to prevent the blocking of the small nozzle with dirt or scale.

In the normal operation of the pasteurizer, valves $p$ and $t$ are wide open and steam is admitted, through valve $v$ and injector $w$, to pipe $f$, inducing a flow of water from tank $e$ through pipe $f$, around milk outlet valve $d$, through pipe $k$, coil $m$ and pipe $n$ back to tank $e$.

During this operation the coil does not act as an Archimedean screw, since the injector forces a solid stream of water through the coil. When the proper pasteurizing temperature is reached valve v is closed and the steam is shut off, either partly or entirely, from the main injector w and the revolving coil acts to circulate the water.

Owing to the belief of many operators that agitation lowers the cream line, the rotation of the coil is often stopped during the "holding period". In order, at this time, to avoid radiation of heat to the air from the fittings with resultant too rapid cooling of the plug of milk in the outlet pocket and the consequent premature cooling of such plug of milk below the correct pasteurizing temperature, the auxiliary injector r remains in operation. This creates a local heating of the water and induces a gentle flow thereof through the jacket c, thereby preventing undue cooling through radiation and maintaining a proper temperature at the outlet during the holding period.

The injector may be operated only during the holding period, but it is preferred to operate it throughout the main pasteurizing operation as well as the holding period: first, because it somewhat aids the flow of water during the main pasteurizing operation; and second, because operators cannot be relied upon to open the injector valve at the proper time.

The provision of a single jacket which surrounds the outlet pipe b and also encloses in part the valve d is in and of itself a novel and useful feature of the pasteurizer.

The valve equipped pipes y and z are provided for cold water or brine in case it is desired to use the pasteurizer for cooling. In such use of the pasteurizer, valves p and t are closed and the valves on pipes y and z are opened.

What I claim and desire to protect by Letters Patent is:

1. The combination with a milk pasteurizing vessel, an outlet therefrom, and means to establish a comparatively rapid endless circulation of heating fluid through the interior of said vessel and around such outlet and to arrest said rapid endless circulation, of means to apply heat locally to the heating fluid and establish a relatively limited flow of such fluid around said outlet after said rapid endless circulation has been arrested.

2. The combination with a milk pasteurizing vessel, an outlet therefrom, a valve controlling said outlet, a circulatory system for heating fluid comprising an endless conduit extending through and outside said vessel, means to establish a relatively vigorous flow of heating fluid through said conduit during the first part of the pasteurizing operation, and a jacket around said outlet and interposed in said endless conduit, of means to locally heat the heating fluid adjacent said jacket and induce a flow of heating fluid therethrough after the vigorous circulation of heating fluid through the pasteurizing vessel has been arrested.

3. The combination with a milk pasteurizing vessel, an outlet therefrom and a valve controlling said outlet, a circulatory system for heating fluid comprising an endless conduit extending through and outside said vessel, means to establish a relatively vigorous flow of heating fluid through said conduit during the first part of the pasteurizing operation, and a jacket around said outlet and interposed in said endless conduit, of a steam injector extending into said conduit so close to said jacket as to induce local heating and flow of heating fluid through said jacket after said vigorous circulation of heating fluid through the pasteurizing vessel has been arrested.

4. The combination with a milk pasteurizing vessel and an outlet therefrom, a circulatory system for heating fluid extending through and outside said vessel and including a jacket around the outlet and fittings adjacent the outlet, of means to establish an endless circulation of heating fluid through said system, and a steam injector connected with one of said fittings and adapted to locally heat the heating fluid and induce a flow of such locally heated fluid through said jacket during the holding period of the pasteurization.

5. The combination with a milk pasteurizing vessel and an outlet therefrom, an endless conduit for heating fluid comprising a coil within the pasteurizer, a heater, pipes, fittings and a jacket around said outlet and between said fittings, of a main injector connected with said conduit between the heater and said fittings, a valve on the conduit adjacent the coil, and an auxiliary injector connected with one of said fittings.

6. The combination with a milk pasteurizing vessel, an outlet and a valve beyond said outlet, a circulatory system for heating fluid extending through and outside said vessel and including a jacket around said outlet and valve and fittings on opposite sides of said jacket, of a steam injector connected with one of said fittings.

7. The combination with a milk pasteurizing vessel, an outlet therefrom and a valve controlling said outlet, a circulatory system for heating fluid comprising an endless conduit extending through and outside said vessel, the part of the conduit extending through said vessel being a revoluble screw, a main steam injector communicating with said conduit at a point relatively remote from said outlet valve and adapted to initially force a stream of heating fluid therethrough, said screw adapted to be revolved and to maintain circulation of heating fluid after steam through the main injector is partly or wholly shut off, and an auxiliary steam injector communicating with said conduit at a point relatively near said milk outlet and adapted to maintain a gentle flow of heating fluid around said outlet in case the rotation of the screw is arrested.

8. The combination with a milk pasteurizing vessel and an outlet therefrom, of a circulatory system for heating fluid extending through and outside said vessel, a valve adjacent said outlet and a jacket around said outlet and partly enclosing the valve and interposed in said circulatory system, and a steam injector connected with a part of the circulating system near said jacket.

WILLIAM SANGSTER.